United States Patent
Amano et al.

(10) Patent No.: US 8,937,821 B2
(45) Date of Patent: Jan. 20, 2015

(54) DC POWER SUPPLY APPARATUS

(75) Inventors: Katsuyuki Amano, Tokyo (JP); Daisuke Suzuki, Tokyo (JP); Katsuhiko Saito, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 218 days.

(21) Appl. No.: 13/021,219

(22) Filed: Feb. 4, 2011

(65) Prior Publication Data

US 2011/0194321 A1    Aug. 11, 2011

(30) Foreign Application Priority Data

Feb. 5, 2010    (JP) ................................ P2010-024185

(51) Int. Cl.
*H02M 1/12*    (2006.01)

(52) U.S. Cl.
USPC ................................ 363/44; 363/84; 363/125

(58) Field of Classification Search
USPC ..................... 363/44–46, 52, 84–89, 125–127
See application file for complete search history.

(56) References Cited

U.S. PATENT DOCUMENTS

| | | | | |
|---|---|---|---|---|
| 5,050,057 | A * | 9/1991 | Notohara et al. | 363/37 |
| 5,661,644 | A | 8/1997 | Bergman et al. | |
| 5,694,311 | A | 12/1997 | Umeda et al. | |
| 6,388,898 | B1 * | 5/2002 | Fan et al. | 363/20 |
| 6,583,993 | B2 * | 6/2003 | Hua | 363/21.06 |
| 7,164,591 | B2 | 1/2007 | Soldano | |
| 7,715,698 | B2 * | 5/2010 | Bonner et al. | 388/804 |
| 7,880,174 | B2 | 2/2011 | Shimizu et al. | |
| 8,076,699 | B2 | 12/2011 | Chen et al. | |
| 8,076,736 | B2 * | 12/2011 | Hayashi et al. | 257/413 |
| 8,279,648 | B2 * | 10/2012 | Dooley | 363/98 |
| 8,320,143 | B2 * | 11/2012 | Leibovitz | 363/89 |
| 2005/0105311 | A1 | 5/2005 | Soldano | |
| 2008/0122497 | A1 | 5/2008 | Ishikawa et al. | |
| 2008/0258252 | A1 | 10/2008 | Shimizu et al. | |
| 2010/0019279 | A1 | 1/2010 | Chen et al. | |

FOREIGN PATENT DOCUMENTS

CN    1365535 A    8/2002

(Continued)

OTHER PUBLICATIONS

Extended Search Report from European Patent Office issued in corresponding European Patent Application No. 11000789.5 dated May 13, 2011.

(Continued)

*Primary Examiner* — Jessica Han
(74) *Attorney, Agent, or Firm* — Buchanan Ingersoll & Rooney PC

(57) ABSTRACT

A DC power supply apparatus comprising: a rectifying circuit including, a first rectifying portion, a second rectifying portion, a third rectifying portion and a fourth rectifying portion; a current detection portion; a first switching portion; and a second switching portion; wherein each of the first rectifying portion cooperatively operating with the first switching portion and the second rectifying portion cooperatively operating with the second switching portion is a semiconductor element which is formed by using a Schottky junction formed between silicon carbide or gallium nitride and metal and has a withstanding voltage property with respect to a voltage of an AC power supply.

12 Claims, 9 Drawing Sheets

(56) References Cited

FOREIGN PATENT DOCUMENTS

| | | | |
|---|---|---|---|
| CN | 1864319 | A | 11/2006 |
| CN | 101290927 | A | 10/2008 |
| CN | 101540343 | A | 9/2009 |
| CN | 101562182 | A | 10/2009 |
| EP | 0 307 719 | A2 | 3/1989 |
| EP | 1 198 058 | A1 | 4/2002 |
| JP | 2001-286149 | A | 10/2001 |
| JP | 2007-527687 | T | 9/2007 |
| JP | 2008-061403 | A | 3/2008 |
| JP | 2008-061412 | A | 3/2008 |
| JP | 2008-092663 | A | 4/2008 |
| JP | 2009-219267 | A | 9/2009 |
| WO | WO 2005/033819 | A2 | 4/2005 |

OTHER PUBLICATIONS

Buso, S. et al., "Performance Evaluation of a Schottky SiC Power Diode in a Boost PFC Application," IEEE Transactions on Power Electronics, Nov. 1, 2003, pp. 1249-1253, vol. 18, No. 6, IEEE Service Center, Piscataway, NJ, XP011103238.

Costel, P. et al., "Bridgeless Power Factor Correction Converter Working at High Load Variation." Signals, Circuits and Systems, 2007, Jul. 1, 2007, pp. 1-4, XP031128686.

Office Action from Chinese Patent Office dated May 6, 2013, issued in corresponding Chinese Patent Application No. 201110034222.1, with English translation thereof. (13 pages).

Japanese Office Action for corresponding Japanese Patent Appln. No. 2010-024185 dated Sep. 3, 2013, with English translation (6 pages).

Office Action from Chinese Patent Office dated Nov. 5, 2013, issued in corresponding Chinese Patent Application No. 201110034222.1, with English translation thereof. (11 pages).

\* cited by examiner

DC POWER SUPPLY APPARATUS

CROSS-REFERENCE TO RELATED APPLICATIONS

This application claims priority from Japanese Patent Application No. 2010-024185 filed on Feb. 5, 2010, the entire contents of which are incorporated herein by reference.

TECHNICAL FIELD

Aspects of the present invention relate to a DC power supply apparatus for performing AC/DC conversion.

BACKGROUND

In a rectifying circuit contained in a DC power supply apparatus of related art, since an input current inputted into the DC power supply apparatus from an AC power supply can not be rectified synchronously with the voltage of the AC power supply, the power factor of the power supply is low and the reactive power amount is large. That is, there arises a problem that the electric power utilization factor is low. The reactive power component is the power returned to the power supply side without being consumed by a load side connected via the DC power supply apparatus, among the power supplied from the power supply. The presence of the reactive power component corresponds to a state that the efficiency of each of the electric power generation and the electric power transmission is low when seen from the power supply side and a state that the electric power supplied from the power supply is not utilized effectively when seen from the load side. Further, the DC power supply apparatus of the related art has a problem that the waveform of the input current inputted from the AC power supply deforms from the sinusoidal waveform, that is, the input current contains much harmonic current component. Thus, there arises a problem that the operation of other apparatuses connected to the same power supply system is interfered and the power transmission facility is damaged. Such the problems are required to be improved according to the International Standard (IEC61000-3) etc. As the measures for the improvement, a DC power supply apparatus is used which performs the PWM control by using semiconductor switching elements to thereby improve the power factor of a power supply, suppress the harmonic current of the power supply and adjust the DC output voltage (see JP-A-2001-286149 (pages 11 to 12, FIGS. 1 to 4)).

Further, according to a recent tendency of energy saving, an inverter circuit for driving a motor etc. uses a Schottky Barrier diode (SBD) made of silicon carbide (SiC) as a power semiconductor module to thereby reduce steady loss due to the voltage drop of the power semiconductor module and to thereby increase the switching speed (turn-on speed) of the power semiconductor module to reduce the switching loss, so as to reduce the loss and the heating amount of the power semiconductor module while almost maintaining the current driving efficiency of the motor etc. (see JP-A-2008-92663 (pages 3 to 4))

In the related-art DC power supply apparatus connected to the AC power supply for improving the power factor of the power supply and suppressing the harmonic current of the power supply, the switching is performed by the switching frequency of about 20 kHz to 25 kHz. In this case, since a large current ripple occurs due to the switching operation on the input current from the AC power supply, there arises a problem that a portion for removing the current ripple component, that is, a filter circuit is required. Further, when the switching frequency is low, since the time control of the current and voltage according to a PWM control becomes rough, there arise problems that the input current from which the current ripple has been removed can not maintain the sinusoidal waveform and is distorted and further a phase shift occurs between the input current and the voltage of the power supply. Furthermore, since the filter circuit for removing the large current ripple component largely influences on the phase of the input current, the waveform of the input current is deformed or distorted. In view of these problems, it is desired to set the harmonic current of the power supply to 0 and set the power factor of the power supply to 1 according to a theoretical design, that is, according to the control by a control circuit.

As a method for solving the problems, related-art discloses a method of increasing the switching frequency of the DC power supply apparatus to thereby finely perform the time control of the PWM control. When the switching frequency is increased, the current ripple becomes small. Thus, the current ripple component can be removed by a filter circuit which scarcely influences except for the removal of the current ripple component. Further, the input current of the sinusoidal waveform having small distortion can be generated due to the fine time control of the PWM control. As a result, the harmonic current of the power supply can be reduced and the power factor of the power supply can be improved, so as to become close to a theoretical design.

However, in the case of increasing the switching frequency of the DC power supply apparatus to be connected to the AC power supply, even when the voltage of the AC power supply is applied so as to follow the high-speed switching operation of the semiconductor switching elements, there is a problem that there is no rectifying element having a high withstanding voltage and current which can prevent the dielectric breakdown thereof.

Further, when the switching frequency is increased in the constituent components of the related art, the loss of each of the semiconductor elements, that is, the rectifying elements and the semiconductor switching elements on a path for flowing the current from the DC power supply apparatus becomes large. Thus, there arise problems that the efficiency of the DC power supply apparatus reduces and the semiconductor elements can not withstand heat generated by the loss and are burnt.

Further, when the switching frequency is increased, since the amount of heat generation increases due to the increase of the loss of the semiconductor elements of the DC power supply apparatus, there arises a problem that the size and the cost of a cooling apparatus increases.

Furthermore, since high-frequency noise is generated due to the high-speed switching operation of the semiconductor elements of the DC power supply apparatus, there arise problems that another apparatus except for the DC power supply apparatus is erroneously operated or the DC power supply apparatus itself is erroneously operated.

SUMMARY

Accordingly, it is an aspect of the present invention to provide a DC power supply apparatus with a high efficiency, which can realize the increase the switching frequency, increase the power factor of the power supply and reduce the harmonic current of the power supply, in a manner that semiconductor elements which can perform high-speed switching operation and to which the voltage of an AC power supply can be applied are used as rectifying elements which operate in cooperation with semiconductor switching elements of the DC power supply apparatus.

According to an aspect of the present invention, a semiconductor element, which is formed by using a Schottky junction formed between metal and silicon carbide (SiC) or gallium nitride (GaN) and has withstanding voltage property with respect to a voltage of the AC power supply, is employed as a rectifying element cooperatively operating with the switching operation of the semiconductor switching element.

Accordingly, because a semiconductor element, which is formed by using the Schottky junction formed between metal and silicon carbide (SiC) or gallium nitride (GaN) and has the withstanding voltage property with respect to the voltage of the AC power supply, is employed as the rectifying element cooperatively operating with the switching operation of the semiconductor switching element, it is possible to obtain a DC power supply apparatus with a high efficiency, which realizes the increase of the switching frequency, is high in the power factor of the power supply and is reduced in the harmonic current of the power supply.

DETAILED DESCRIPTION

First Exemplary Embodiment

Figure 1:
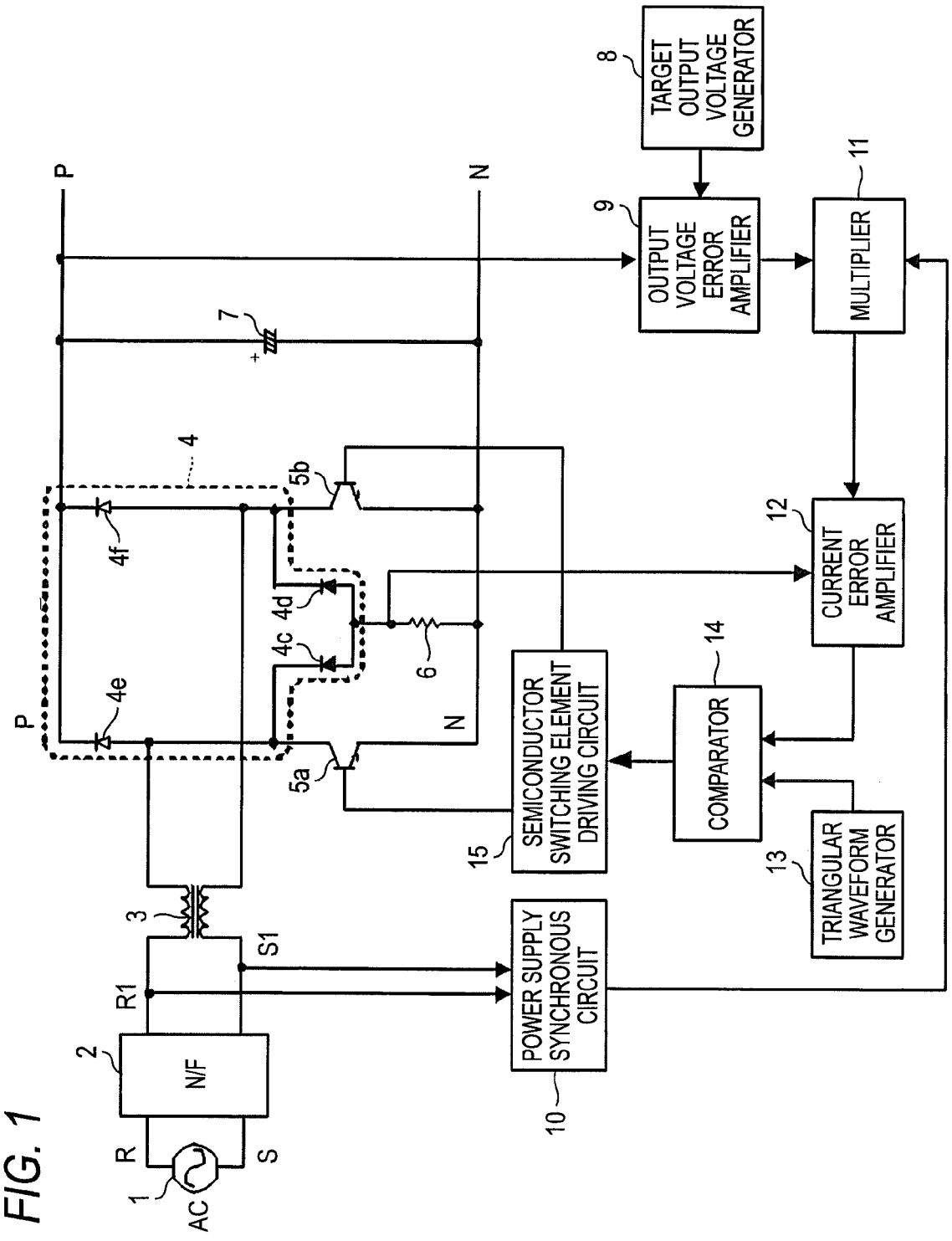
FIG. 1 is a diagram showing circuit configuration of a half-bridge type converter circuit according to a first exemplary embodiment of the present invention.

FIG. 1 is a diagram showing a circuit configuration of a half-bridge type converter circuit according to a first exemplary embodiment of the present invention, which is a DC power supply apparatus that is used for a household electrical appliance such as an air conditioner and performs the improvement of the power factor of the power supply, the reduction of the harmonic current of the power supply and the adjustment of a DC output voltage. The description hereinafter is based on the half-bridge type converter circuit. An AC power supply 1 is connected to a rectifying circuit 4 via a noise filter 2 and a reactor 3. The rectifying circuit 4, that is, a diode bridge circuit is configured by rectifying elements, that is, diodes 4c, 4d, 4e and 4f in a manner that the rectifying elements 4e, 4f are connected to the positive electrode terminal side of the rectifying circuit 4 and the rectifying elements 4c, 4d are connected to the negative electrode terminal side of the rectifying circuit 4. Further, a current detection shunt resistor 6 is connected to the negative electrode terminal of the rectifying circuit 4. Semiconductor switching elements 5a, 5b for performing switching operations according to the PWM control are respectively connected to the rectifying elements 4c, 4d of the rectifying circuit 4 and also connected to the current detection shunt resistor 6. The rectifying output side of the rectifying circuit 4 is connected to a smoothing capacitor 7 and further connected to an inverter device etc, for operating the air conditioner. The AC power supply 1 supplies the AC power from the outside of the air conditioner, and the constituent elements other than the AC power supply 1 in the figure are provided within the air conditioner. The AC power supply 1 is used in general at the input AC voltage of about 100 V to 240 V in order to operate a household electrical appliance such as the air conditioner.

In FIG. 1, the R and S lines of the AC power supply 1 are connected to the inputs of the noise filter 2 and the R1 and S1 output lines of the noise filter 2 are connected to the inputs of the reactor 3. The noise filter 2 acts to suppress noise transmitted from the AC power supply 1 and also to suppress noise so as not to transmit the noise to the AC power supply 1 from the noise filter 2. Within the noise filter 2, the R line of the AC power supply 1 connected to the R1 line of the noise filter 2, and the S line of the AC power supply 1 connected to the S1 line of the noise filter 2. The positive electrode terminal of the rectifying circuit 4 is connected to the positive electrode of the smoothing capacitor 7 to thereby constitute a P line, that is, the positive electrode output terminal of the DC power supply apparatus. The negative electrode terminal of the rectifying circuit 4 is connected to the negative electrode of the smoothing capacitor 7 via the current detection shunt resistor 6 to thereby constitute an N line, that is, the negative electrode output terminal of the DC power supply apparatus. According to the aforesaid configuration, the output voltage and current of the AC power supply is subjected to the full-wave rectification by the rectifying circuit via the noise filter 2 and the reactor 3. A pulsating flow after the full-wave rectification is smoothed by the smoothing capacitor 7 and converted into a DC current and a DC voltage, that is, a DC power supply. The DC power thus converted is supplied to other apparatuses and circuits within the air conditioner, for example, the inverter device, etc., for driving a fan motor and a compressor.

The semiconductor switching element 5a is connected in parallel to the series connection of the rectifying element 4c and the current detection shunt resistor 6 in an opposite manner in its polarity to the polarity of the rectifying element 4c so as to flow the current in an opposite direction. Similarly, the semiconductor switching element 5b is connected in parallel to the series connection of the rectifying element 4d and the current detection shunt resistor 6 in an opposite manner in its polarity to the polarity of the rectifying element 4d so as to flow the current in an opposite direction. The semiconductor switching elements 5a, 5b are controlled so as to control the AC input current inputted from the AC power supply 1 and also control the DC output voltage generated at the both ends of the smoothing capacitor 7. The current detection shunt resistor 6 detects a current for controlling the semiconductor switching elements 5a, 5b.

Further, the control block of FIG. 1 is configured by: a target output voltage generator 8 which outputs a command signal of a target voltage value, that is a target output voltage between the both ends of the smoothing capacitor 7, that is, between the P-N lines; an output voltage error amplifier 9 which receives the target output voltage from the target output voltage generator 8 and a DC output voltage that is an actual voltage between the P-N lines, then obtains and amplifies an error component between the target output voltage and the DC output voltage and outputs the amplified error component as an output voltage error component signal; a power supply synchronous circuit 10 which subjects the output voltage of the AC power supply 1 to the full-wave rectification to thereby obtain and output a sinusoidal reference wave signal; a multiplier 11 which receives the output voltage error component signal from the output voltage error amplifier 9 and the sinusoidal reference waveform signal from the power supply synchronous circuit 10 and multiplies the output voltage error component signal and the sinusoidal reference waveform signal together to thereby output the multiplied value as an output voltage error amplification signal; a current error amplifier 12 which receives an actual current signal generated from a current flowing through the current detection shunt resistor 6 and the output voltage error amplification signal from the multiplier 11, and then obtains and amplifies an error component between the actual current signal and the output voltage error amplification signal and outputs the amplified error component as a current error amplification signal; a triangular waveform generator 13 which generates a triangular waveform signal for controlling the switching frequency of the semiconductor switching elements 5a, 5b; a comparator 14 which receives the triangular waveform signal from the triangular waveform generator 13 and the current error amplification signal from the current error amplifier 12 and compares the triangular waveform signal and the current error amplification signal to thereby output a PWM driving signal; and a semiconductor switching element driving circuit 15 which receives the PWM driving signal from the comparator 14 to thereby turn on and off, that is, switch the semiconductor switching elements 5a, 5b in accordance with the PWM driving signal.

Figure 2:
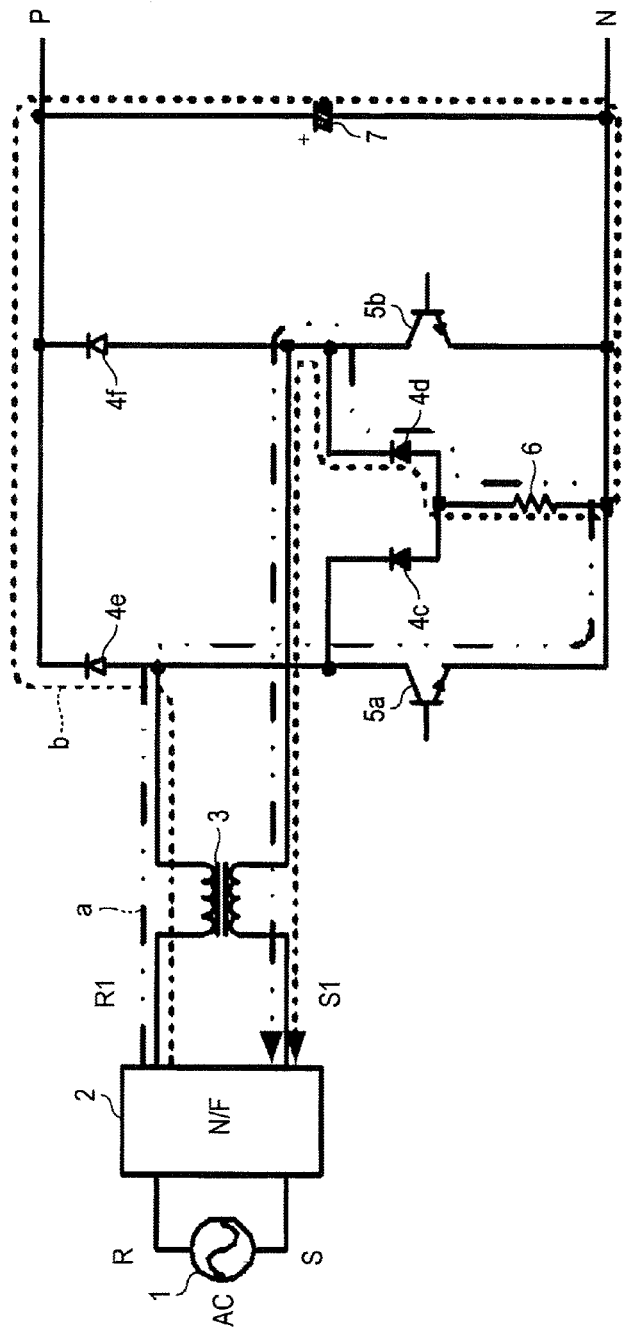
FIG. 2 is a diagram for explaining currents flowing through a circuit according to the first exemplary embodiment of the present invention.

Next, the explanation will be made with reference to FIGS. 2 and 3 as to the circuit operation, that is, the flow of the current to the smoothing capacitor 7 from the AC power supply 1. FIG. 2 shows a case where the output voltage of the AC power supply 1 is a positive half wave, that is, a case where positive voltage is applied to the R line of the AC power supply 1 and negative voltage is applied to the S line of the AC power supply 1.

In FIG. 2, when each of the semiconductor switching elements 5a, 5b is in a turn-on state, a short-circuit current flows through a path, that is, a loop of a broken line a which starts from the R line of the AC power supply 1 and returns to the S line of the AC power supply 1 via the noise filter 2, the R1 line of the noise filter 2, the reactor 3, the semiconductor switching element 5a, the current detection shunt resistor 6, the rectifying element 4d, the reactor 3, the S1 line of the noise filter 2 and the noise filter 2. Thus, the input current from the AC power supply 1 increases and the energy is accumulated in the reactor 3.

In contrast, when each of the semiconductor switching elements 5a, 5b is in a turn-off state in FIG. 2, a current flows through a path, that is, a loop of a dotted line b which starts from the R line of the AC power supply 1 and returns to the S line of the AC power supply 1 via the noise filter 2, the R1 line of the noise filter 2, the reactor 3, the rectifying element 4e, the smoothing capacitor 7, the current detection shunt resistor 6, the rectifying element 4d, the reactor 3, the S1 line of the noise filter 2 and the noise filter 2, whereby the smoothing capacitor 7 is charged. In this case, since the energy accumulated in the reactor 3 is outputted to and charged in the smoothing capacitor 7 together with the power supplied from the AC power supply 1, the DC output voltage is boosted. Further, since the AC power supply 1 charges the smoothing capacitor 7 together with the reactor 3, the input current from the AC power supply 1 reduces with respect to the case where the short-circuit current flows through the loop of the broken line a.

Figure 3:
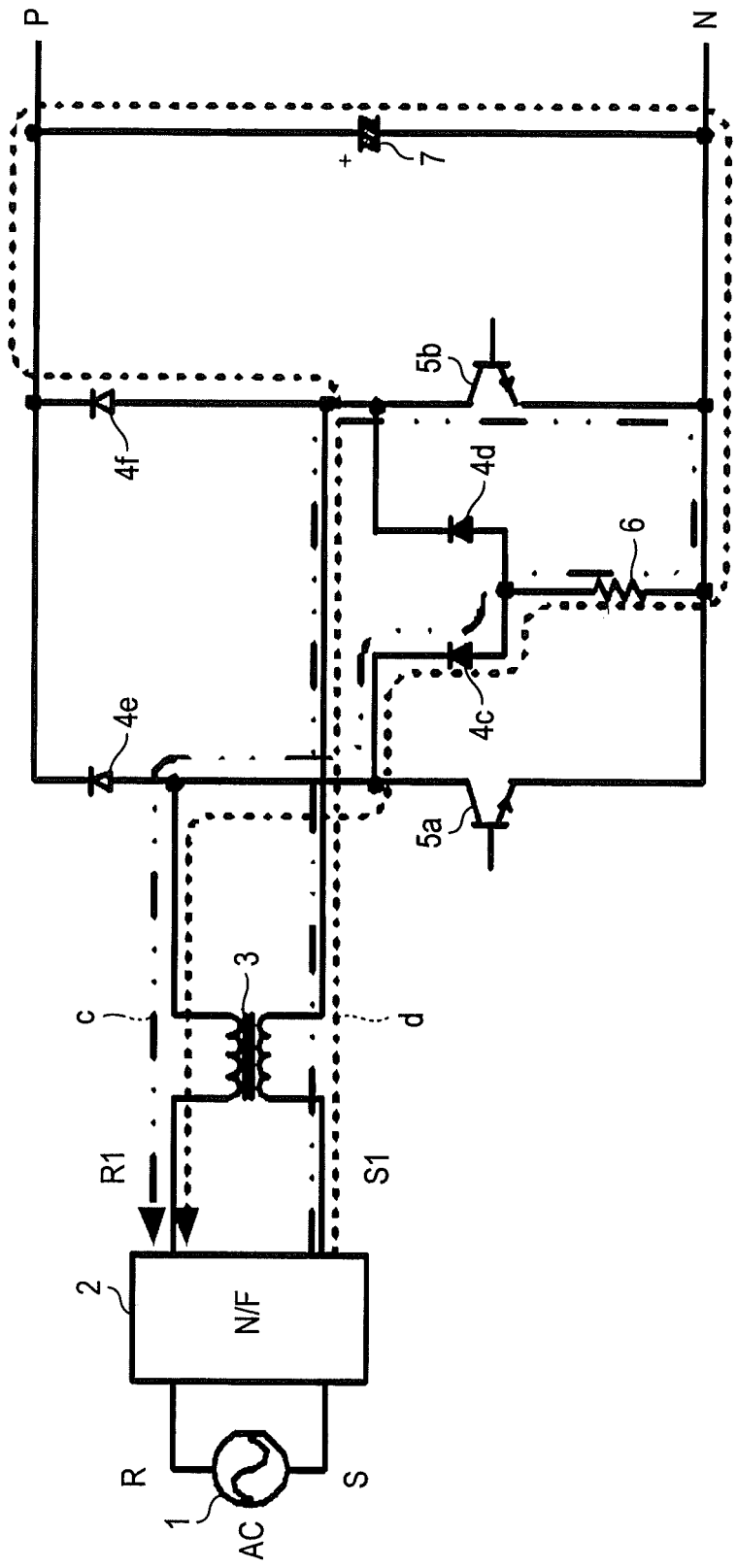
FIG. 3 is a diagram for explaining currents flowing through the circuit according to the first exemplary embodiment of the present invention.

Next, FIG. 3 shows a case where the output voltage of the AC power supply 1 is a negative half wave, that is, a case where the negative voltage is applied to the R line of the AC power supply 1 and the positive voltage is applied to the S line of the AC power supply 1.

In FIG. 3, when each of the semiconductor switching elements 5a, 5b is in the on state, a short-circuit current flows through a path, that is, a loop of a broken line c which starts from the S line of the AC power supply 1 and returns to the R line of the AC power supply 1 via the noise filter 2, the S1 line of the noise filter 2, the reactor 3, the semiconductor switching element 5b, the current detection shunt resistor 6, the rectifying element 4c, the reactor 3, the R1 line of the noise filter 2 and the noise filter 2. Thus, the input current from the AC power supply 1 increases and the energy is accumulated in the reactor 3.

In contrast, when each of the semiconductor switching elements 5a, 5b is in the off state in FIG. 3, a current flows through a path, that is, a loop of a dotted line d which starts from the S line of the AC power supply 1 and returns to the R line of the AC power supply 1 via the noise filter 2, the S1 line of the noise filter 2, the reactor 3, the rectifying element 4f, the smoothing capacitor 7, the current detection shunt resistor 6, the rectifying element 4c, the reactor 3, the R1 line of the noise filter 2 and the noise filter 2, whereby the smoothing capacitor 7 is charged. In this case, since the energy accumulated in the reactor 3 is outputted to and charged in the smoothing capacitor 7 together with the power supplied from the AC power supply 1, the DC output voltage is boosted. Further, since the AC power supply 1 charges the smoothing capacitor 7 together with the reactor 3, the input current from the AC power supply 1 reduces with respect to the case where the short-circuit current flows through the loop of the broken line c.

The aforesaid operations are repeated and the power supply voltage and the input current are controlled so as to have the same phase, whereby the power factor of the power supply can be improved. Further, since the input current is rendered to have a sinusoidal waveform, a harmonic current of a high-order component contained in the input current, that is, the harmonic current of the power supply can be reduced, and the DC output voltage is boosted by the energy accumulated by the reactor 3. In the case where the AC power supply 1 has an AC 100 V, the converted DC voltage can be boosted to about DC 400 V, and the DC voltage is controlled in a variable manner within this range.

Next, the explanation will be made as to an operation for controlling the input current so as to have a sinusoidal waveform. In the control block shown in FIG. 1, the output voltage error amplifier 9 calculates an output voltage error component based on the target output voltage from the target output voltage generator 8 and the actual DC output voltage detected between the P-N lines to thereby adjust the DC output voltage. That is, the output voltage error amplifier 9 controls so as to increase the energy accumulated in the reactor 3 by increasing the input current when the DC output voltage is lower than the target output voltage, whilst controls so as to reduce the energy accumulated in the reactor 3 by reducing the input current when the DC output voltage is larger than the target output voltage.

Next, the multiplier 11 outputs the output voltage error amplification signal of a sinusoidal waveform based on the output voltage error component signal from the output voltage error amplifier 9 and the sinusoidal reference waveform signal from the power supply synchronous circuit 10. The power supply synchronous circuit 10 obtains the sinusoidal reference waveform signal by converting the voltage of a sinusoidal waveform having the same phase as that of the voltage between the R1-S1 lines detected from the R1, S1 lines as the output of the noise filter 2, that is, the power supply voltage of the AC power supply 1. The multiplier 11 outputs a current of a sinusoidal waveform synchronous with the power supply voltage of the AC power supply 1 by using the sinusoidal reference waveform signal of a sinusoidal waveform having the same phase as that of the power supply voltage of the AC power supply 1. The power factor of the power supply approaches 1 since the input current of the power supply 1 is converted into the current having the same phase with that of the power supply voltage and synchronous therewith. Further, the harmonic current of a high-order component contained in the input current, that is, the harmonic current of the power supply approaches 0 since the waveform of the input current of the AC power supply 1 is made close to a sinusoidal waveform. Although it is desirable to obtain the sinusoidal reference waveform signal from the R1, S1 lines on the output side of the noise filter 2 from which noise is removed, the sinusoidal reference waveform signal may be obtained from the R, S line on the input side so long as there is no problem as to noise etc.

Next, the current error amplifier 12 calculates the current error amplification signal based on the sinusoidal reference waveform signal and the actual current signal to thereby adjust an actual flowing current. That is, the current error amplifier 12 controls so as to increase the actual flowing current when the actual current signal is smaller than the sinusoidal reference waveform signal, whilst controls so as to reduce the actual flowing current when the actual current signal is larger than the sinusoidal reference waveform signal.

Lastly, the comparator 14 generates the PWM driving signal based on the current error amplification signal from the current error amplifier 12 and the triangular waveform signal from the triangular waveform generator 13. The semiconductor switching elements 5a, 5b are turned on and off in accordance with the PWM driving signal generated from the comparator 14. That is, the switching frequency of the semiconductor switching elements 5a, 5b is controlled in accordance with the triangular waveform signal and the ratio of the turn-on period and the turn-off period of the semiconductor switching elements 5a, 5b is controlled in accordance with the current error amplification signal. Further, as explained with reference to FIGS. 2 and 3, when each of the semiconductor switching elements 5a, 5b is in the turn-on state, the short-circuit current flows, whereby the input current from the AC power supply 1 increases and the energy is accumulated in the reactor 3. In contrast, when each of the semiconductor switching elements 5a, 5b is in the turn-off state, the input current from the AC power supply 1 reduces and the energy having been accumulated in the reactor 3 is outputted to the smoothing capacitor 7 side to thereby boost the DC output voltage.

By repeating the aforesaid operation with the switching frequency, that is, a switching period for switching the semiconductor switching elements 5a, 5b, the input current and the DC output voltage is controlled.

Figure 4A:
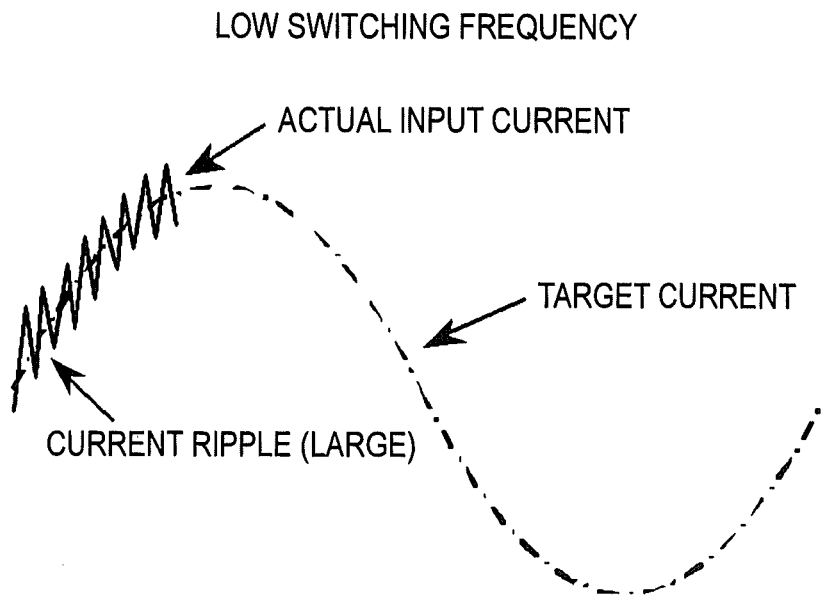
FIG. 4 (4A and 4B) is a diagram for explaining an input current in the first exemplary embodiment of the present invention.
Figure 4B:
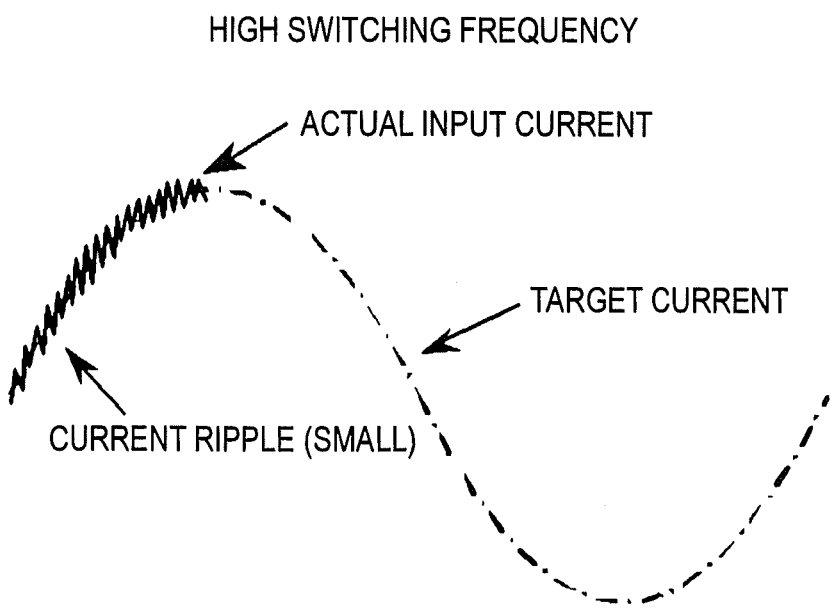

Since the semiconductor switching elements 5a, 5b are driven by the PWM driving signal, the changing state of the input current changes in accordance with the length of the repetition time of the turn-on and off operation, that is, the switching period. That is, when the switching period is long, since the on and off times within the switching period also become long, a changing time of the current becomes long and a changing amount of the current become large. Thus, as shown in FIG. 4A, the input current becomes a current having a rough sinusoidal waveform, that is, a sinusoidal current having a large current ripple. In contrast, when the switching period is short, since the on and off times within the switching period also become short, the changing time of the current becomes short and the changing amount of the current becomes small. Thus, as shown in FIG. 4B, the input current becomes a current having a smooth sinusoidal waveform, that is, a sinusoidal current having a small current ripple.

Although the current ripple is prevented from flowing on the AC power supply 1 side by providing a filter circuit, configured by a normal coil etc. within the noise filter 2, for removing the current ripple component, the size of the circuit for removing the current ripple becomes larger as the current ripple becomes larger.

In the DC power supply apparatus, it is necessary to approach the waveform of the input current to a more accurate sinusoidal waveform in order to increase the power factor of the power supply and suppress the harmonic current of the power supply. To this end, it is necessary to increase the switching frequency. That is, it is necessary, by increasing the switching frequency, to perform fine time control of the PWM control to thereby generate the current with an accurate sinusoidal waveform and also to reduce the current ripple to thereby reduce the influence of the filter circuit for removing the current ripple component. Thus, the input current, from which the current ripple is removed, is prevented from being distorted from the sinusoidal waveform and from causing the deviation from the synchronous phase etc.

However, in the configuration of the semiconductor of a related art, when the switching operation (turn-on and off operation) of the switching semiconductor is performed at a high speed in order to increase the switching frequency, an unnecessary current flows between the switching of the current flowing state, which results in a loss of a state transition.

Figure 5:
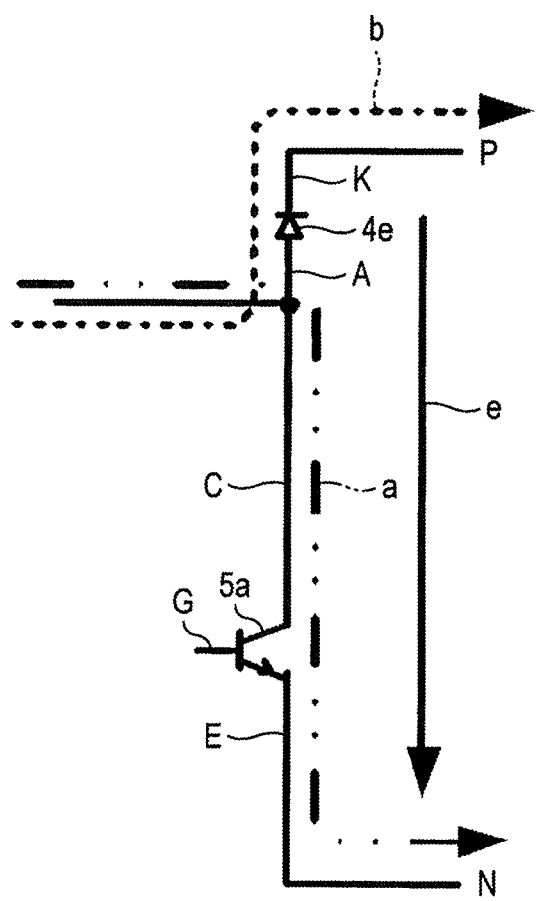
FIG. 5 is a diagram for explaining currents flowing through semiconductor elements in the first exemplary embodiment of the present invention.

The loss of the state transition that an unnecessary circuit current flows at the time of the switching operation will be explained with reference to FIG. 5. FIG. 5 shows the rectifying element 4e shown in FIGS. 1 and 2, the semiconductor switching element 5a and the periphery thereof. In the figure, like FIG. 2, when the semiconductor switching element 5a is turned on, the current flows through the path of the broken line a. In contrast, when the semiconductor switching element 5a is turned off, the current flows through the path of the dotted line b. In FIG. 5, K denotes a cathode terminal of the rectifying element 4e, A denotes an anode terminal of the rectifying element 4e, C denotes a collector terminal of the semiconductor switching element 5a, E denotes an emitter terminal of the semiconductor switching element 5a and G denotes a gate terminal of the semiconductor switching element 5a.

When the semiconductor switching element 5a is in the off state, the rectifying element 4e is placed in an on state since the anode terminal A of the rectifying element 4e is applied with a voltage higher than that of the cathode terminal K thereof, that is, applied with a forward bias voltage. Thus, a current flows toward the cathode terminal K from the anode terminal A. In this case, when a turn-on signal is applied to the gate terminal G of the semiconductor switching element 5a, the semiconductor switching element 5a is placed in a conductive state between the collector terminal and the emitter terminal to thereby flow a current toward the emitter terminal E from the collector terminal C. However, the voltage of the anode terminal A of the rectifying element 4e gradually changes to a value lower than the voltage of the cathode terminal K, that is, a reverse bias voltage. Further, the rectifying element 4e gradually performs the state transition from the current conductive state to a current interruption or blocking state. That is, the rectifying element 4e is placed for a short time in the conductive state which can not operate in cooperation with the semiconductor switching element 5a and so a current flows toward the emitter terminal E of the semiconductor switching element 5a from the cathode terminal K of the rectifying element 4e as shown by a solid line e in FIG. 5. In other words, a reverse recovery current is generated in the rectifying element 4e and flows into the semiconductor switching element 5a. The semiconductor switching element 5a actively places in the conductive state between the collector terminal and the emitter terminal thereof in response to the turn-on signal inputted into the gate terminal G thereof. In contrast, the movement of electric charges is caused within the rectifying element 4e due to the voltage difference and the current flow caused by the switching operation of the semiconductor switching element 5a, the rectifying element 4e passively blocks the current condition. Thus, the operation of the rectifying element is slow.

Thus, in the turn-on and off states of the semiconductor switching element 5a, in addition to the current flowing state through the path of the broken line a and the current flowing state through the path of the dotted line b, there is the state that the current flows through the path of the solid line e at the time of the switching operation of the semiconductor switching element 5a, in particular, at the moment where the state transition occurs from the off state to the on state, that is, upon the timing of the turning-on operation. However, as explained with reference to FIG. 2, even if the current flows through the path of the solid line e, since the energy charging or discharging of the rector 3 is not performed yet, the increase or decrease of the input does not occur. In other words, since this reverse recovery current is irrelevant to the improvement of the power factor of the power supply, the suppression of the harmonic current of the power supply and the adjustment of the DC output voltage, the current that flows through the path of the solid line e is an unnecessary operation current.

On the other hand, there arise some problems when a reverse recovery current flows through the path of the solid line e shown in FIG. 5.

For example, FIG. 6 shows voltage waveforms between the collector terminal and the emitter terminal of the semiconductor switching element and, in particular, show voltage waveforms when the semiconductor switching element turns on. When the semiconductor switching element is in the off state, since the state between the collector terminal and the emitter terminal thereof is same as the opened state of a switch, the maximum voltage is applied between these terminals and so the current flowing between these terminals is interrupted. In contrast, when the semiconductor switching element is in the on state, since the state between the collector terminal and the emitter terminal thereof through which the current is flown by the semiconductor switching element is same as the closed state of a switch, the voltage difference between these terminals becomes 0 and so the current flows between these terminals.

Figure 6A:
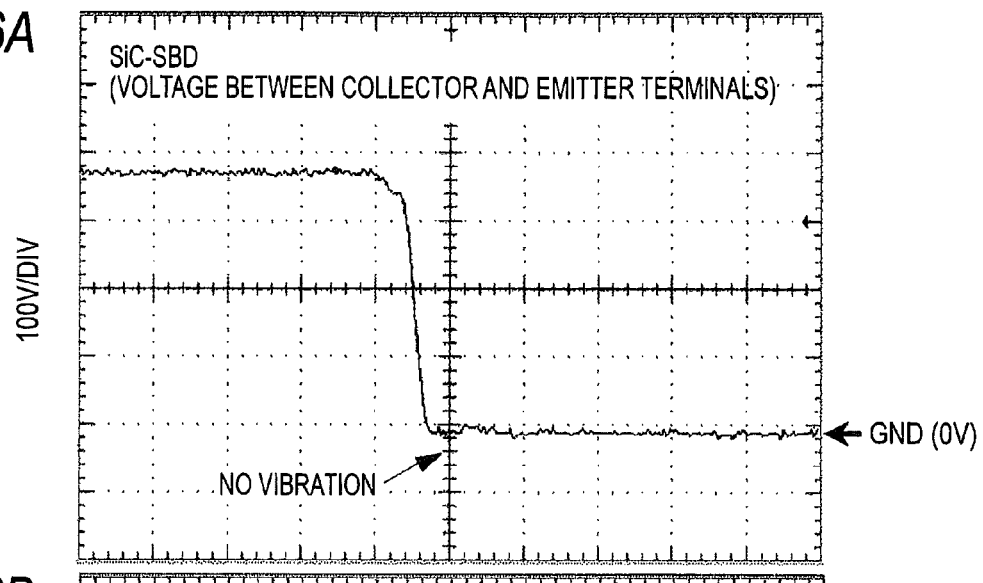
FIG. 6 (6A and 6B) is a diagram showing switching waveforms in the first exemplary embodiment of the present invention.
Figure 6B:
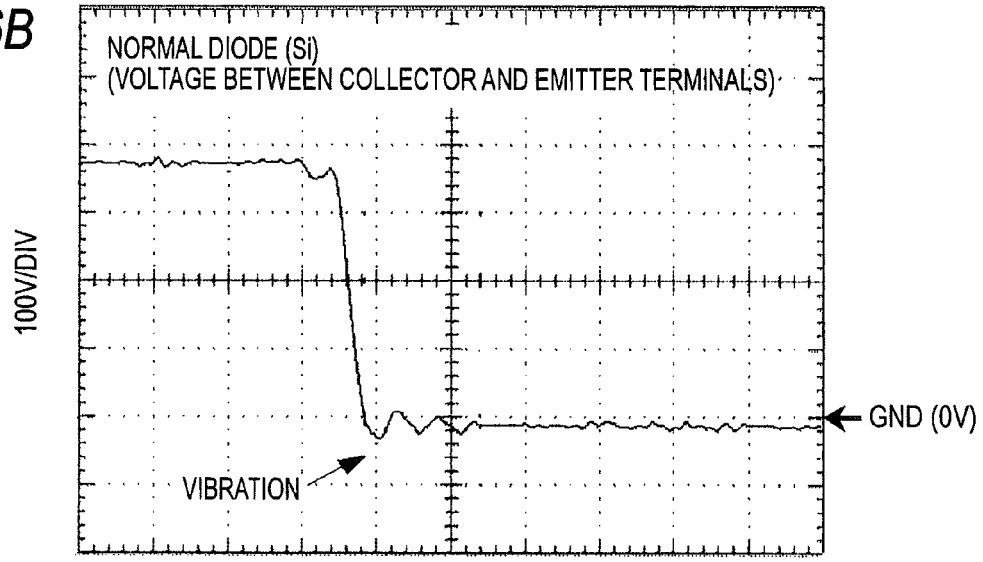

Although not shown in FIG. 6, the reverse recovery current flowing at the time of the turning-on of the semiconductor switching element changes abruptly, that is, has a large temporal change value di/dt. Thus, this current causes LC resonance with a reactance component (L) and a capacitance component (C) of a peripheral circuit, whereby this current appears as a linking voltage, that is, a vibration voltage as shown in FIG. 6B. This linking voltage acts as electromagnetic noise to thereby induce an erroneous operation at a peripheral circuit or interfere with the signal transmission. In particular, when the switching frequency is increased, the generation frequency of the linking voltage increases, which is a large problem to be solved in order to realize the high-speed switching. To this end, although not shown in FIGS. 1 to 3, a noise countermeasure component as a countermeasure for the electromagnetic noise is attached. Usually, an electronic component such as a ferrite core acting as a choke coil to be easily attached to a wiring on a circuit is used as this countermeasure component. These noise countermeasure components differ in effects depending on the actual circuit configuration or the wiring arrangement even when a circuit configuration shown in the figure is same. In this manner, since the noise countermeasure component has particular characteristics with respect to the actual circuit configuration, the illustration thereof is omitted. Since this countermeasure component is irrelevant to the efficiency of the improvement of the power factor of the power supply, the reduction of the harmonic current of the power supply and the adjustment of the DC output voltage to be realized by this circuit and control, this countermeasure component merely increases the weight, size and cost of the DC power supply apparatus and reduces the circuit efficiency.

Further, since the reverse recovery current passes through the semiconductor switching element, the loss is generated in the semiconductor switching element due to the unnecessary current not contributing to any of the improvement of the power factor of the power supply, the reduction of the harmonic current of the power supply and the adjustment of the DC output voltage. Thus, an amount of heat generated in the semiconductor switching element increases. The efficiency of the DC power supply apparatus is degraded due to the unnecessary loss and a cooling apparatus such as a heat sink having an unnecessary size is required due to the heat generated by the loss. Theoretically it is sufficient to select the semiconductor switching element which is configured by a semiconductor chip designed, that is, having a necessary capacitance or size in view of the currents shown in FIGS. 2 and 3. However, as the actual design, it is necessary in order to realize the exemplary embodiment to select the semiconductor switching element which is configured by a semiconductor chip having an excessive capacitance or size so as to provide heat endurance in view of the current component flowing at the operation other than the theoretical control operation. In particular, this is a large problem to be solved in order to realize the increasing of the switching frequency.

Further, since this unnecessary current finally increases the input current from the AC power supply 1 but does not contribute to the output of the DC power supply, there is a problem that this unnecessary current merely reduces the circuit efficiency.

This phenomenon of generating the reverse recovery current also occurs in the case of FIG. 3 in the same theory and explanation as FIG. 5 by merely replacing the rectifying element 4e and the semiconductor switching element 5a in FIG. 5 by the rectifying element 4f and the semiconductor switching element 5b, respectively.

In order to reduce the reverse recovery current and realize the high-speed switching operation, in the circuit of FIG. 1, a Schottky barrier diode (hereinafter called a SBD) is applied to each of the rectifying elements 4e. 4f each of which is slow in the switching operation. This is because the SBD is small in the reverse recovery electric charges, short in the reverse recovery time, that is, small in the reverse recovery current and capable of performing the high-speed blocking operation.

The SBD is a diode utilizing the Schottky junction, whilst the rectifying diode as a general rectifying element utilizes a PN junction. In the PN junction, the current transportation is mainly performed by the minority carriers within a semiconductor. In contrast, in the Schottky junction, since the current transportation is performed by the majority carriers, the Schottky junction has the characteristic that a value of the voltage drop in the forward direction to the cathode terminal from the anode terminal is small and the switching speed is high. However, the Schottky junction has the drawback that the leakage current in the reverse direction is large at the time of applying a high voltage in the reverse direction to the anode terminal from the cathode terminal and the reverse-direction withstanding voltage is low. Thus the SBD has not been employed in a high-voltage/large-current circuit, which is connected directly to the AC power supply in use, due to the reason that the loss caused by the leakage current is large and the SBD can not withstand the applied voltage. The normal SBD has a tradeoff that when the carrier density of the drift layer is reduced in order to maintain the reverse-direction withstanding voltage, the voltage drop in the forward direction increases. In contrast, when the carrier density of the drift layer is increased in order to suppress the voltage drop in the forward direction, the leakage current in the reverse direction increases and the reverse-direction withstanding voltage degrades or reduces. However, when the Schottky junction between silicon carbide (hereinafter called SiC) or gallium nitride (hereinafter called GaN) as semiconductor and metal such as titanium is used in place of the Schottky junction between silicon (Si) as semiconductor and metal constituting the normal SBD, the leakage current in the reverse direction can be reduced. Further, the leakage current in the reverse direction can be reduced while holding the reverse-direction withstanding voltage in combination with such a configuration or method that the interface where the semiconductor and the metal is joined is extremely flattened to thereby uniformize the height of the Schottky barrier which is the potential barrier formed at the interface, that is, to thereby suppress a phenomenon that both metallic atoms and semiconductor atoms pass and diffuse through the interface due to the interfacial chemical reaction and hence the height of the Schottky barrier varies at respective portions of the interface. According to such configuration, each of the reverse-direction withstanding voltage and the leakage current in the reverse direction is improved while maintaining the characteristics of the SBD of the related art as to the voltage drop in the forward direction and the high-speed switching operation. Further, since such the SBD can withstand the applied voltage of the AC power supply and has a small loss of the leakage current, this SBD can be employed in a high-voltage/large-current circuit. In other words, an SiC-SBD can be formed which is an SBD using SiC capable of being used in a high-voltage/large-current circuit. This SiC-SBD is used as each of the rectifying elements 4e, 4f in FIG. 1. An SBD having the same effects can be obtained when GaN is used in place of SiC.

Accordingly, by employing such the SBD, the semiconductor switching element can smoothly perform the switching operation in cooperation with the rectifying element without replacing the semiconductor switching element, that is, even by using the semiconductor switching element of the related art, whereby the high-speed switching operation of the semiconductor switching element can be realized as it is.

Even if the SiC-SBD, in which the switching characteristics are improved, is employed in a rectifying circuit, the rectifying function of the diode is not changed. Thus, when the SiC-SBD is used as each of the rectifying elements, not only the high-speed switching operation is performed but also the voltage drop in the forward direction is suppressed since the carrier density of the drift layer is adjusted. Thus, the loss due to the voltage drop in the forward direction of each of the rectifying elements 4e, 4f itself reduces and so an amount of heat generated therefrom can also be suppressed.

Further, since the semiconductor chip is formed by using SiC, the dielectric breakdown withstanding voltage of the semiconductor chip becomes almost 10 times as large as that of the silicon (Si). Furthermore, the current density to be dealt can be made large and so the maximum current can be made larger as compared with the silicon. Thus, the withstanding voltage can be increased by forming the drift layer for securing the withstanding voltage with SiC and the current can be increased while not changing the area of the semiconductor chip. In the case of forming the semiconductor chips having almost same withstanding voltage and maximum current, the semiconductor chip formed by SiC can be made small in size as compared with the semiconductor chip formed by silicon (Si) by thinning the layer for securing the withstanding voltage and by reducing the area for passing thought the current.

Further, since the semiconductor chip is formed by SiC, the heat endurance can be improved in a manner that the semiconductor chip can be operated at the temperature of about 300 degrees Celsius as compared the semiconductor chip formed by silicon (Si) having the similar efficiency which thermal limitation is about 200 degrees Celsius. Further, since the thermal conductivity of the semiconductor chip formed by SiC is almost three times as large that of the semiconductor chip formed by silicon (Si), the heat dissipation capacity can be improved.

As described above, since each of the rectifying elements 4e, 4f, through which a large reverse recovery current flows in response to the switching operation of the corresponding one of the semiconductor switching elements 5a, 5b, is formed by the SiC-SBD, an amount of the reverse recovery electric charges becomes quite small and so the reverse recovery time becomes quite short. That is, since an amount of the reverse recovery current becomes quite small, the switching loss of each of the semiconductor switching elements 5a, 5b can be made small. For example, as to the SiC-SBD with a rated reverse withstanding voltage of 600 V and a rated forward current of 6 A which is generally used in the case of the input voltage of AC 100V of the AC power supply, an amount of the reverse recovery electric charges is almost 20 nC which is quite small as compared with 150 to 1,500 nC in the case of the usual PN junction diode. Thus, an amount of the reverse recovery current becomes also small in the SiC-SBD.

Figure 7:
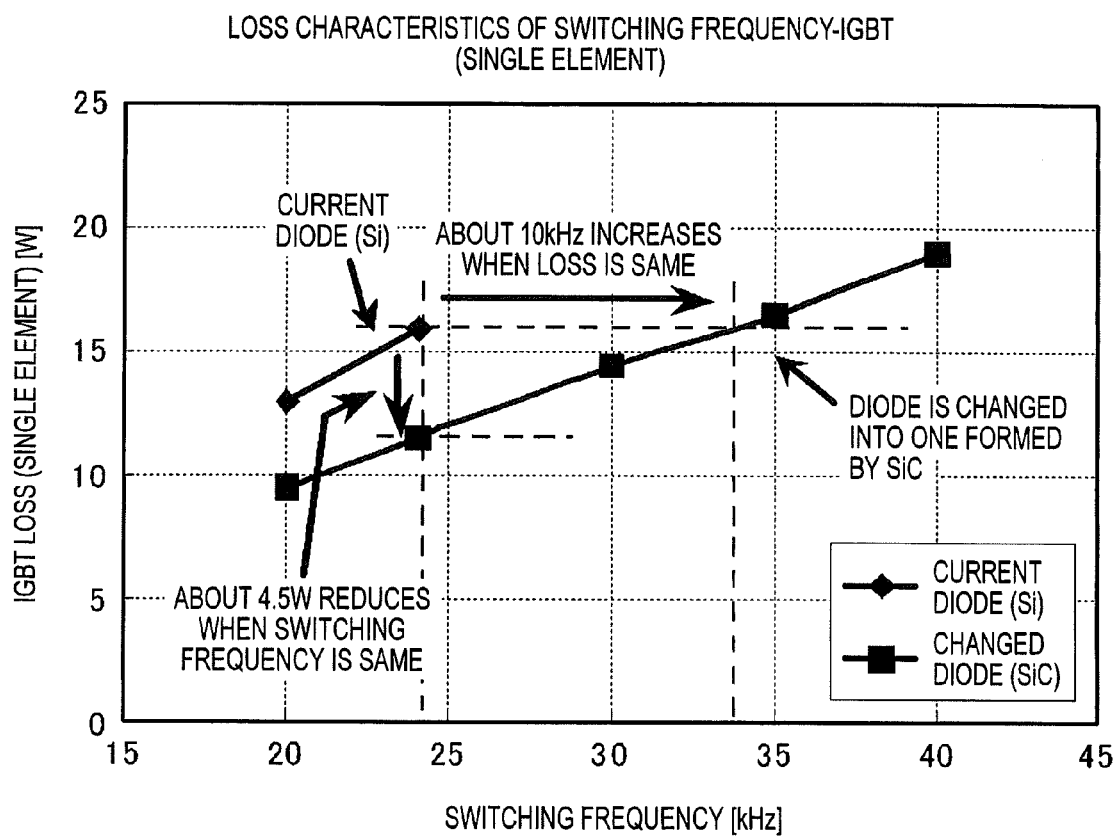
FIG. 7 is a diagram showing relation between loss and switching frequency in the first exemplary embodiment of the present invention.

FIG. 7 is a diagram showing graphs representing the loss of the single IGBT element as the semiconductor switching element in the case of using a general silicon PN junction diode and in the case of using the SiC-SBD as the rectifying element for a half-bridge type converter circuit employing semiconductors with a rated reverse withstanding voltage of about 600 V and a rated forward current of about 20 Arms which is popular in the air conditioner having an input of AC 100V of the AC power supply. According to the graphs, when the SiC-SBD is used in place of the general silicon PN junction diode, the reduction of the loss of about 4.5 W is admitted in the case of driving at the current maximum switching frequency of 24 kHz. Since there are the two semiconductor switching elements 5a, 5b, the loss can be improved by about 9 W in total, which corresponds to about 60% of the loss at the time of the turn-on operation. In addition to the switching loss of the semiconductor switching elements shown in FIG. 7, the loss of the rectifying elements, that is, the loss of the SiC-SBDs such as the loss due to the forward direction voltage drop was reduced by about 3 W. Thus, since the loss of about 12 W can be improved in the entirety of the circuit, the circuit employing the SiC-SBDs can largely contribute, when applied to the air conditioner requiring the energy saving and the efficiency improvement.

When the switching frequency is same as the current frequency, this loss improvement can realize the downsize of the a heat dissipation component, for example, a heat sink, which also contributes to the ease of the restriction of the mounting location, the cost down and downsize of electric components. Further, an amount of silicon compound, that is, heat dissipation grease to be pasted between the heat sink and the semiconductor switching elements or the rectifying elements can be reduced. Similarly, a heat dissipation sheet to be sandwiched between the heat sink and the semiconductor switching elements or the rectifying elements can be replaced by another one having a large thermal resistance, whereby the circuit can be fabricated with a low cost. Furthermore, the contact surface between the heat sink and the semiconductor switching elements or the rectifying elements has been extremely flattened by the milling process etc. so as to maintain a small contact resistance as possible. However, when there is a margin in the cooling efficiency as described above, the process such as the milling process requiring a long time can be eliminated, whereby the circuit can be fabricated with a further low cost.

Further, by applying the aforesaid effects of the reduction of an amount of heat generation, the switching frequency may be increased to a value raising an amount of heat generation to almost the current degree, while maintaining the current state of the cooling apparatus.

Furthermore, similarly, by applying the aforesaid effects of the reduction of an amount of heat generation, the input current may be increased to a value raising an amount of heat generation to almost the current degree to thereby intend the large capacity of the circuit, while maintaining the current states of the cooling apparatus and the switching frequency.

Supposing that the switching frequency is maintained to the current value, in the high-voltage/large-current circuit used by directly converting the AC power supply, the semiconductor switching element configured by the semiconductor chip has been selected at the time of designing in a manner that the semiconductor chip has an excessive capacity or size so as to have the thermal endurance in view of the theoretical current value or more. However, according to the aforesaid configuration, since an amount of the reverse recovery electric charges becomes small, a sufficient operation of the circuit can be realized by the semiconductor switching element having the semiconductor chip smaller than the currently designed one.

Further, supposing that the switching frequency is maintained to the current value, according to the aforesaid configuration, the time period of the phenomenon shown in FIG. 6A becomes shorter and the amplitude of the linking voltage, that is, the vibrated voltage component shown in FIG. 6B becomes smaller. Thus, the degree of generated noise also reduces and the obstacle of the signal transmission is suppressed. Therefore, since it becomes possible to reduce the required number, weight and size of the choke coils as the noise countermeasure components can be reduced, the power loss due to the resistance components of the choke coils can also be reduced, which contributes to the high efficiency of the DC power supply apparatus.

When the switching frequency is increased by performing the high-speed switching operation, according to FIG. 7 showing the relation between the switching frequency and the loss of the single IGBT element as the semiconductor switching element, in the case of using the SiC-SBD, the loss upon the turning-on of the semiconductor switching element can be increased to about 9 W (loss of the single element is about 4.5 W) to thereby increase the switching frequency as compared with the current silicon PN junction diode. This increase of the loss corresponds to the increase of about 10 kHz. That is, as the entirety of the circuit, by employing the SiC-SBD, the loss of about 12 W can be increased by using the improvement of the loss of about 12 W due to the loss at the time of the turning-on and the loss of the forward direction voltage drop. Thus, when this increase of the loss is used for the increase of the switching frequency, the switching frequency can be increased to about 35 kHz to 40 kHz from the switching frequency of about 20 kHz to 25 kHz of the related art. In other words, the switching frequency of 25 kHz or more, which has been difficult to realize while maintaining the circuit and configuration of the related art, can be realized, whereby the DC power supply apparatus realizing the high power factor of the power supply and the reduction of the harmonic current of the power supply can be obtained.

According to the increase of the switching frequency, in the switching of the current path, for example, the switching between the paths of the broken line a and the dotted line b by the single-time turning-on/off operation explained in FIGS. 2 and 3, the time and amount of the charging and discharging of the energy the reactor 3 becomes shorter and smaller. Thus, since the capacitance of the reactor 3 can be made small, the size and the weight thereof can also be reduced. Supposing that the switching frequency is raised to be about twice, for example, to about 40 kHz from about 20 kHz, the capacitance, that is, a reactance value of the reactor 3 can be made about 220 µH, that is, reduced by about 50% (about a half). When the core of the reactor 3 is the same, since the number of the winding can be made half, the used amount of the copper winding can be reduced and hence the cost thereof can also be reduced. Further, since the copper loss of the reactor can be made half, the entire efficiency can be improved. Although there is a difference according to the material of the core and the winding of the reactor 3, in the case of the air conditioner for flowing a large current, since an amount of the loss of the reactor is large, the degree of the improvement of the efficiency due to the half-reduction of the copper loss is quite large. Further, due to the increase of the switching frequency, since the high-frequency high-magnetic material, which is low in the effects at the low frequency, can be used as the core material, the core can be downsized. Thus, when the circuit including the core, which reactance value is set to be almost half, is designed again, in the high-voltage/large-current circuit used by directly converting the AC power supply, the reactor can be designed so as to be small in its size and loss as compared with the current reactor. As a result, not only the cost of the reactor can be reduced but also the restriction of the mounting location of the reactor 3, which has been a component generating a large amount of heat, can be eased and further the electric component can be downsized.

Figure 8:
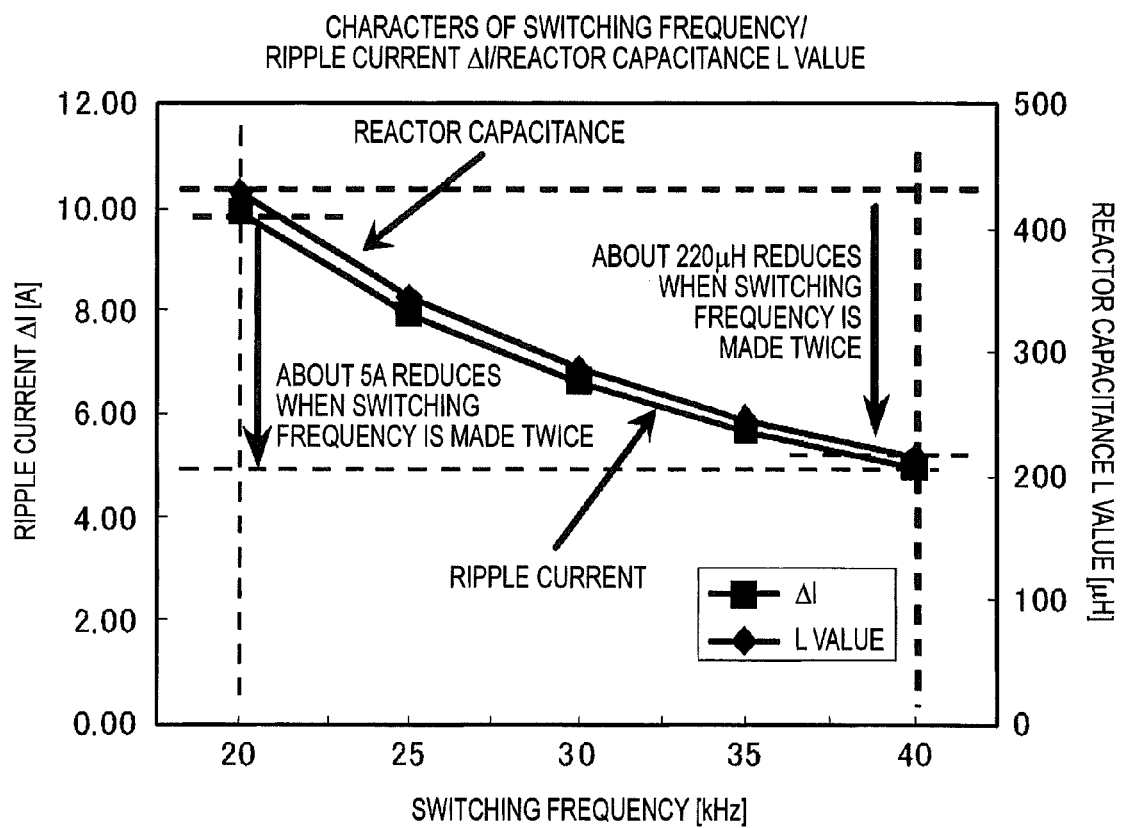
FIG. 8 is a diagram showing relation between the switching frequency and a current ripple and a relation between the switching frequency and a reactor capacitance in the first exemplary embodiment of the present invention.

Further, since an amount of the current ripple can be reduced due to the increase of the switching frequency, the noise filter 2 can be reduced in its size and weight. Like the reactor 3, supposing that the switching frequency is raised to about 40 kHz from about 20 kHz, the current ripple contained in the input current explained with reference to FIG. 4 can be made about 5 A, that is, reduced by about 50% (about half) as shown in FIG. 8. Thus, in the filter circuit for removing the current ripple configured by the normal coil etc. provided within the noise filter 2 so as not to flow the current ripple on the AC power supply 1 side. The filter circuit for removing the current ripple can be downsized in such a manner that the normal coil can be designed again so as to reduce the capacitance value thereof to be half. Further, since the constituent components of the circuit are formed by the high-frequency material, the entire volume of the circuit becomes small. Thus, in the high-voltage/large-current circuit used by directly converting the AC power supply, the noise filter 2 can be reduced in its size, weight and cost.

Further, since the time control of the PWM control can be performed finely due to the increase of the switching frequency, the performance of the filter circuit for removing the current ripple can be reduced by the reduction of the current ripple and the degree of the influence of the filter circuit affecting on the current phase etc. can be reduced. Thus, even if the current ripple is removed from the input current, the input current after the removal can be made close to the accurate sinusoidal waveform. As a consequence, the deviation from the synchronous phase etc. with respect to the power supply voltage can not be caused, and hence the high power factor of the power supply and the low harmonic current of the power supply can be realized.

Further, since the circuit is realized in a manner that the SiC-SBD is used for the rectifying elements 4e, 4f which operate in cooperation with the semiconductor switching elements 5a, 5b, the circuit can be realized without performing such a large design change that the remaining rectifying elements 4c, 4d and the semiconductor switching elements 5a, 5b are changed from the semiconductor constituent components of the related art.

Although the above-described disclosure has been made as to the example where the SiC-SBD is used for the rectifying elements 4e, 4f which operate in cooperation with the semiconductor switching elements 5a, 5b and most effective in the high-speed switching operation, the SiC-SBD may also be used for the rectifying elements 4c, 4d. When the SiC-SBD is used for the rectifying elements 4c, 4d, due to the improvement characteristics of the forward-direction voltage drop of the SiC-SBD, the loss of the rectifying elements 4c, 4d can also be reduced and soothe efficiency of the entirety of the circuit can be improved. Of course, the cooling apparatus such as the heat sink corresponding to the rectifying elements 4c, 4d can be downsized due to the reduction of the loss of the rectifying elements 4c, 4d. Since the influence on the high-speed switching operation is small as to the rectifying elements 4c, 4d, the diode of the SBD configuration may not be used for each of these rectifying elements so long as each of these rectifying elements is formed by using SiC.

Each of the semiconductor switching elements 5a, 5b may be formed by using SiC. When each of the semiconductor switching elements 5a, 5b is formed by using SiC or GaN, the semiconductor switching elements each having a wide band gap are realized, whereby the high withstanding voltage can be realized by a small semiconductor chip. Further, since the forward direction voltage drop, that is, an internal resistance at the time of flowing the current through each of the semiconductor switching elements 5a, 5b reduces, the loss of each of the semiconductor switching elements 5a, 5b reduces. The cooling apparatus such as the heat sink corresponding to the semiconductor switching elements 5a, 5b can be downsized due to the reduction of the loss of the semiconductor switching elements 5a, 5b. In the case where each of the semiconductor switching elements 5a, 5b and the rectifying elements 4c, 4d, 4e, 4f is attached to the same heat sink and is formed by using SiC or GaN, the heat sink can be downsized as a whole, which contributes to the ease of the restriction of the heat dissipation structure.

Further, when each of the semiconductor switching elements 5a, 5b and the rectifying elements 4c, 4d, 4e, 4f is formed by using SiC, the withstanding property thereof with respect to a high voltage and a large current can be improved.

For example, when the switching operation is performed at a high seed and a high frequency, a serge voltage or a surge current is generated to thereby cause a trouble. However, even when such the surge current enters into the DC power supply apparatus side from the AC power supply 1 side or such the surge current is generated and transmitted from other device such as a driving circuit for a fan or a compressor connected to the smoothing capacitor 7, each of the rectifying elements 4e, 4f scarcely breaks down when formed by using SiC. Further, when each of the rectifying elements 4c, 4d, 4e and 4f is formed by using SiC, even if the semiconductor switching elements 5a, 5b become failure due to a serge voltage or a surge current, the normal rectifying operation can be performed by using the rectifying elements 4c, 4d, 4e and 4f. Thus, since it is possible to supply the electric power to other devices, there is enough time to store the state and cause etc. of the failure in a control memory and to determine the stop or continue as to the power supply.

Of course, when each of the semiconductor switching elements 5a, 5b and the rectifying elements 4c, 4d, 4e, 4f is formed by using SiC, it is possible to provide the DC power supply apparatus which more unlikely becomes failure.

In the case where each of the semiconductor switching elements 5a, 5b is a transistor such as an IGBT, when the PWM driving signal for turning on the semiconductor switching element is inputted therein to thereby apply a voltage in the forward direction, that is, a forward bias voltage is applied between the collector and emitter terminals thereof, the transistor flows the current in the forward direction to the emitter terminal E from the collector terminal C. However, when the voltage in the reverse direction, that is, a reverse bias voltage is applied between the collector and emitter terminals of the semiconductor switching element, the semiconductor switching element does not flow the current in the reverse direction toward the collector terminal C from the emitter terminal E. Thus, even when the same PWM driving signal is inputted to the semiconductor switching elements 5a, 5b to thereby simultaneously turn-on and off these elements irrespective of the forward bias voltage or the reverse bias voltage applied between the collector and emitter terminals of each of the semiconductor switching elements 5a, 5b according to the positive or negative voltage from the AC power supply 1, since there arises no path except for a path for flowing the current through only one of the semiconductor switching elements 5a, 5b, there arises no problem that the current flowing between the collector and emitter terminals is blocked.

Like the general inverter device for converting a DC current into an AC current to drive a motor etc., it is supposed a circuit which is configured in a manner that semiconductor switching elements which collector sides are connected to the P line and constitute an upper arm are provided and also semiconductor switching elements which emitter sides are connected to the N line and constitute a lower arm are provided, wherein the emitter sides of the upper arm and the collector sides of the lower arm are connected to thereby constitute a set of arms formed by the upper and lower arms, and wherein this circuit is configured by three arms and six semiconductor switching elements in the case of driving a three-phase motor, for example. In this circuit, at the moment where one of the upper and lower arms performs the switching operation, the reverse recovery currents flow into the diodes connected in parallel to each of the upper and lower arms. However, it is quite difficult and takes a long time to predict and design in advance as to the relation between the reverse recovery currents of the six diodes and the semiconductor switching elements through each of which the corresponding one of the reverse recovery currents flows. Further, in the PWM control for performing the frequency control for changing the rotation speed for driving the motor and performing the voltage control for changing the output voltage, the pulse pattern of the PWM driving signal is complicated and there arises such a pattern that two or more of the upper and lower arms simultaneously perform the switching operation to flow the currents. That is, since the cooperative operation with the semiconductor switching elements is complicated, it is not easy to design or change the control in view of the influence of the voltage change dv/dt and the current change di/dt and the current flow. Thus, in general inverter device, noise can not always be reduced even when the diodes are formed by using SiC.

In contrast, the DC power supply apparatus for converting the DC current of the AC power supply into the AC current according to the exemplary embodiment of the present invention is configured to perform the switching operation by the semiconductor switching element which is connected in parallel to the series connection of the negative electrode side of the rectifying circuit 4 and the current detection shunt resistor 6, that is, the semiconductor switching element which is connected to the N line. According to this configuration, the input current is controlled in a state that the voltage of the AC power supply has a constant effective value and the switching frequency is almost constant to thereby perform the control to improve the power factor of the power supply, suppress the harmonic current of the power supply and change the DC output voltage. Thus, the pulse pattern of the PWM driving signal for the PWM control does not become complicated but is simple. Thus, it is easy to apply the countermeasure to the components which operate cooperatively with the semiconductor switching elements so as to perform the design or change the control for suppressing the linking voltage or the linking current that is a voltage or a current resonating with the LC component to cause the vibration. There does not arise such a problem that the control operation is obstructed and a failure occurs in the circuit configuration even when each of the rectifying elements 4e, 4f is formed by using the SiC-SBD.

Although in the aforesaid configuration, the current detection shunt resistor 6 is provided so as to commonly detect the currents of the positive half-wave and the negative half-wave in FIGS. 2 and 3, the shunt resistors may be respectively provided independently for the positive half-wave and the negative half-wave so as to detect the currents of the positive and negative half-waves in a switching manner. Further, in place of the shunt resistor, a current sensor such as a current transformer or a current mirror circuit incorporated in the semiconductor switching element may be employed.

Further, the improvement of the loss due to the reduction of the reverse recovery current may be utilized as the countermeasure for the electromagnetic noise.

The switching loss of each of the semiconductor switching elements 5a, 5b increases when such a change is performed that the switching speed, that is, the turning-on or turning-off speed of each of the semiconductor switching elements 5a, 5b is delayed, that is, the resistance value of a not-shown gate resistor etc. connected to the gate terminal is increased. On the other hand, the change di/dt of the reverse recovery current at the time of the turning-on of each of the semiconductor switching elements 5a, 5b also becomes slow, so that the electromagnetic noise is suppressed. In the case of delaying the turning-on or turning-off speed of each of the semiconductor switching elements 5a, 5b despite that the loss of about 12 W increases so as to compensate by the aforesaid improvement of the loss of about 12 W obtained by forming the rectifying portion by using the SiC-SBD, the voltage change dv/dt between the collector and emitter terminals of each of the semiconductor switching elements 5a, 5b can be suppressed to almost half, for the purpose of calculation, so long as the efficiency is the same. Although the efficiency of the DC power supply apparatus is almost same as the conventional one, since the radiation noise near 100 MHz, in particular, can be suppressed to a large extent, the required number, weight and size of the choke coils as the countermeasure component for the noise can be reduced.

As described above, each of the rectifying elements cooperatively operating with the semiconductor switching elements is configured by SBD formed by using SiC or GaN which is formed by the Schottky junction that is small in the reverse recovery electric charges and the reverse recovery current and so capable of performing the high-speed switching operation and, which can withstand the dielectric breakdown even when the AC voltage of about 100 V to 240 V of the AC power supply or the DC voltage obtained by rectifying, smoothing and boosting the output of the AC power supply and being converted to the voltage of twice or more of the AC power supply from almost voltage of the AC power supply is applied. Thus, the switching frequency can be increased even as to the circuit to which the voltage of the AC power supply is applied, whereby the current ripple component on the input current of the AC power supply can be reduced, and the current ripple removal portion can be suppressed, that is, the influence on the input current of the circuit can be suppressed. Accordingly, it is possible to obtain the DC power supply apparatus which can suppress the harmonic current of the power supply with a high power factor of the power supply according to the theoretical design, that is, according to the control of the control circuit.

Further, since the rectifying element cooperatively operating with the semiconductor switching element is formed by the SiC-SBD, it is possible to obtain the DC power supply apparatus which can suppress the harmonic current of the power supply with a high power factor of the power supply without large changing the circuit configuration and the circuit components of the related art.

Figure 9:
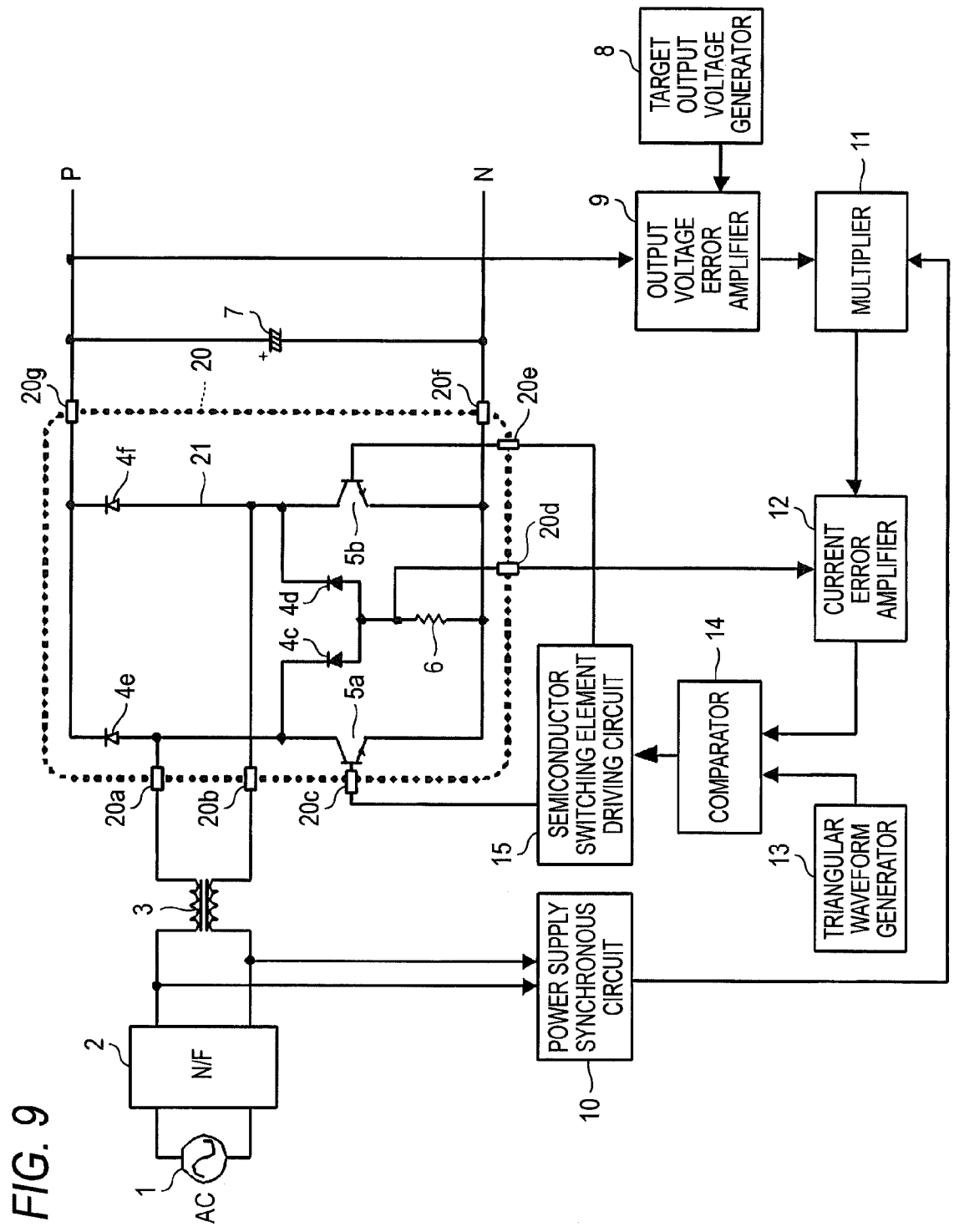
FIG. 9 is a diagram showing a circuit configuration of a half-bridge type converter circuit according to another exemplary embodiment of the present invention.

FIG. 9 shows another exemplary embodiment according to the present invention in which a part of or the entire half-bridge type converter circuit is molded by insulating resin and integrated as a single module 20. The basic configuration of this exemplary embodiment is same as the first exemplary embodiment.

In FIG. 9, a lead frame having a sufficiently large wiring thickness as compared with the thin film wiring couples the rectifying circuit 4, the semiconductor switching elements 5a, 5b and the current detection shunt resistor 6 which are electronic components through which a large current flows, then these components thus connected by the wire lead are molded by the insulating resin together and integrated to form the module 20. The elements 20a to 20g of the module 20 act as board attachment terminals for attaching the module to the board and also act as electrodes for passing currents and transmitting signals into the module. The module 20 is attached on the thin film wiring of the circuit board via the board attachment terminals 20a to 20g by means of solder, whereby the module is connected via the thin film wiring of the circuit board to other electronic components such as the smoothing capacitor 7. When the module 20 is attached to the board, in the case where this module is a dual in-line type module where the board attachment terminals 20a to 20g are provided at the both sides of the module of a rectangular parallelepiped shape, for example, the module 20 is soldered in a manner that the metal surface thereof continuing from the lead frame and on the opposite side of the other surface facing the board is exposed so that the metal surface acts to dissipate heat of the module. The heat sink for the heat dissipation is attached on the metal surface so as to perform the heat dissipation more efficiently. Since the metal surface of this module is exposed so as to improve the heat dissipation structure, the metal surface may not be exposed but may be entirely molded by the insulating resin in the case where the efficiency of the heat dissipation is good. Further, although the explanation is made in the case of the dual in-line type module, a single in-line type module may be employed in place thereof. In this case, the heat sink is also attached on the exposed metal surface of the module 20 to thereby perform the heat dissipation. Since the operation is same as that of FIG. 1, the explanation thereof will be omitted.

As described above, since the rectifying circuit 4, the semiconductor switching elements 5a, 5b and the current detection shunt resistor 6 are molded by the insulating resin together and integrated to form the module 20, the size of the board can be made small as compared with the case where these constituent components are formed on the thin film wiring board. In particular, the aforesaid configuration can be effectively utilized for an electrical household appliance such as an air conditioner which uses a high voltage and a large current, that is, about AC 100 V to 240 V and about 20 A of the AC power supply and about DC 400 V of the DC conversion output and which is required to be housed in a small space. Although the thin film wiring accorded to the about AC 100 V to 240 V and about 20 A of the AC power supply and about DC 400 V of the DC conversion output is required to have a large pattern width, a large creeping distance and a large space distance, such the restriction can be eliminated when the module is formed in the aforesaid manner. Thus, the apparatus can be downsized.

Further, since the semiconductor elements can be mounted as a single module component, the assembling property can be improved as compared with the case where the respective semiconductor elements are mounted on the circuit board by the soldering.

Further, although the explanation is made as to the example where each of the rectifying elements 4e, 4f is formed by the SiC-SBD, each of the rectifying elements 4c, 4d and the semiconductor switching elements 5a, 5b may be formed by using SiC. In this case, the same effects as explained with reference to FIG. 1 can be obtained.

Since each of the rectifying elements 4e, 4f is formed by the SiC-SBD, the loss of the semiconductor switching elements 5a, 5b side can be suppressed. Further, since an amount of heat generated from the SiC-SBD itself reduces, the heat dissipation mechanism can be simplified, whereby the module 20 can be downsized. Further, since it is not necessary to design in view of the prediction of the loss due to an unnecessary current, sufficiently small semiconductor chips can be selected according to the theoretical design, whereby the module 20 can further be downsized.

Further, since the semiconductor elements which generate heat can be attached to the single heat dissipation by integrating these elements as a module, the dissipation mechanism can be concentrated and downsized and hence the mounting/assembling procedure can be performed efficiently.

In the case of realizing the countermeasure as to noise generated due to the further increase of the frequency, since the noise sources are concentrated at the single module and the peripheral circuit thereof, the noise can be shielded concentrically within a small range. Thus, the countermeasure for the noise can be realized easily with a low cost.

Further, since not only the loss reduces but also both the heat endurance property and the heat dissipation property is improved due to the employment of the SiC, the shielding close to the sealed state can be realized. In this manner, the countermeasures can be performed flexibly.

Such a countermeasure as to the tracking due to dust or obstacle matter can also be realized at low cost due to the downsizing and the module without performing the countermeasures widely. Further, since the loss reduces and the heat endurance property improved due to the employment of the SiC, the countermeasure can be realized even if the performance of the heat dissipation mechanism for the module such as a wind path is degraded.

Further, although the apparatus for the AC power supply of AC 100 V and AC 200 V within Japan and the apparatus for the AC power supply of AC 240 V for the abroad have been designed independently, since it becomes easy to raise the voltage withstanding property of the module due to the employment of the SiC, the apparatus can cope with the various types of the power supplies used in the world by employing the single module. Thus, since the apparatus can cope with the power supply such as the AC power supply of AC 100 V to 240 V, the convenience and the efficiency of the design of the products can be improved.

Further, even in the case of independently fabricating the circuits and the apparatuses for the respective power supplies so as to cope with the AC 100 V and AC 200 V, for example, and providing the products, since the circuits and the apparatuses can be manufactured by merely exchanging the module component, the design of the apparatus can be made common to the respective power supplies.

Further, in the case of mounting the module 20 on the circuit board, since the size of the module 20 is small, an area of the circuit loop by the thin film wiring on the thin film wiring board becomes small and hence the length of the wiring becomes short. Thus, it becomes possible to suppress the radiation noise caused by the wiring inductance of the thin film wiring and the erroneous operation due to the radiation noise. Further, it is possible to employ such a configuration that the current detection shunt resistor 6 is not provided within the module 20 but provided outside thereof to thereby facilitate the setting of the current detection level by changing the resistance value of the current detection shunt resistor 6. Also it is possible to employ such a configuration that the driving circuit for the semiconductor snitching elements is incorporated within the module to thereby directly couple the control signal to the module 20.

If necessary, the current detection shunt resistor 6 may also be integrated within the module 20 and molded together with the semiconductor elements as a signal module.

As described above, the thin film wiring board formed by mounting the module on the circuit board can be downsized due to the downsizing of the module, the countermeasure structure for the noise and the countermeasure structure for heat dissipation. Thus, it is possible to obtain the DC power supply apparatus which is low in cost, small in size, high in efficiency and performance, low in the noise generation degree, and high in the reliability as to the erroneous operation etc.

With respect to the semiconductor switching elements within the module, at least each of the rectifying elements cooperatively operating with the semiconductor switching elements is configured by SBD formed by using SiC or GaN, which is formed by the Schottky junction that is small in the reverse recovery electric charges and the reverse recovery current and so capable of performing the high-speed switching operation and, which can withstand the dielectric breakdown even when the AC voltage of about 100 V to 240 V of the AC power supply or the DC voltage obtained by rectifying, smoothing and boosting the output of the AC power supply and being converted to the voltage of twice or more of the AC power supply from almost voltage of the AC power supply is applied. Thus, the switching frequency can be increased even as to the circuit to which the voltage of the AC power supply is applied, whereby the current ripple component on the input current of the AC power supply can be reduced, and the current ripple removal portion can be suppressed, that is, the influence on the input current of the circuit can be suppressed. Accordingly, it is possible to obtain the DC power supply apparatus which can suppress the harmonic current of the power supply with a high power factor of the power supply according to the theoretical design, that is, according to the control of the control circuit.

Although the exemplary embodiments of the present invention has been explained by taking an air conditioner as an example, this invention can be applied to other devices using the DC power supply such as an air blower for performing the air cleaning and the air blasting, a refrigeration device such as a freezer, a refrigerator or a showcase, and a water heater for feeding hot water. Further, this invention can also be applied in the similar manner to a freezer or an air conditioner using water and brine, such as a chiller.

What is claimed is:

1. A DC power supply apparatus comprising:
a rectifying circuit including,
a first rectifying portion,
a second rectifying portion,
a third rectifying portion, and
a fourth rectifying portion,
wherein the first rectifying portion and the second rectifying portion are connected to a positive electrode terminal of the rectifying circuit so as to be parallel to each other,
the third rectifying portion and the fourth rectifying portion are connected to a negative electrode terminal of the rectifying circuit so as to be parallel to each other,
one end of an AC power supply is connected between the first rectifying portion and the third rectifying portion, and
an other end of the AC power supply is connected between the second rectifying portion and the fourth rectifying portion;
a current detection portion which is connected to the negative electrode terminal of the rectifying circuit and detects a current flowing through the rectifying circuit;
a first switching portion which is connected in parallel to the current detection portion and the third rectifying portion;
a second switching portion which is connected in parallel to the current detection portion and the fourth rectifying portion;
a control portion which generates a control signal for controlling a ratio between an on period and an off period of each of the first switching portion and the second switching portion;
a comparing portion which compares the control signal with a triangular waveform signal for controlling a switching frequency of 25 kHz or more of the first switching portion and the second switching portion to generate a PWM control signal; and
a driving portion which drives the first switching portion and the second switching portion in accordance with the PWM control signal,
wherein each of the first rectifying portion cooperatively operating with the first switching portion and the second rectifying portion cooperatively operating with the second switching portion is a semiconductor element which is formed by using a Schottky junction formed between silicon carbide and metal and has a withstanding voltage property with respect to a voltage of the AC power supply.

2. The DC power supply apparatus according to claim 1, wherein each of the third rectifying portion and the fourth rectifying portion is formed by silicon carbide.

3. The DC power supply apparatus according to claim 1, wherein each of the first switching portion and the second switching portion is formed by silicon carbide.

4. The DC power supply apparatus according to claim 1, wherein the first switching portion and the second switching portion is integrated to form a module.

5. A freezing apparatus driving an air blower or a compressor by using a DC output supplied from the DC power supply apparatus according to claim 1.

6. An air conditioning apparatus driving an air blower or a compressor by using a DC output supplied from the DC power supply apparatus according to claim 1.

7. A DC power supply apparatus comprising:
a rectifying circuit including,
a first rectifying portion,
a second rectifying portion,
a third rectifying portion, and
a fourth rectifying portion,
wherein the first rectifying portion and the second rectifying portion are connected to a positive electrode terminal of the rectifying circuit so as to be parallel to each other,
the third rectifying portion and the fourth rectifying portion are connected to a negative electrode terminal of the rectifying circuit so as to be parallel to each other,
one end of an AC power supply is connected between the first rectifying portion and the third rectifying portion, and
an other end of the AC power supply is connected between the second rectifying portion and the fourth rectifying portion;
a current detection portion which is connected to the negative electrode terminal of the rectifying circuit and detects a current flowing through the rectifying circuit;
a first switching portion which is connected in parallel to the current detection portion and the third rectifying portion;
a second switching portion which is connected in parallel to the current detection portion and the fourth rectifying portion;
a control portion which generates a control signal for controlling a ratio between an on period and an off period of each of the first switching portion and the second switching portion;
a comparing portion which compares the control signal with a triangular waveform signal for controlling a switching frequency of 25 kHz or more of the first switching portion and the second switching portion to generate a PWM control signal; and
a driving portion which drives the first switching portion and the second switching portion in accordance with the PWM control signal, wherein each of the first rectifying portion cooperatively operating with the first switching portion and the second rectifying portion cooperatively operating with the second switching portion is a semiconductor element which is formed by using a Schottky junction formed between gallium nitride and metal and has a withstanding voltage property with respect to a voltage of the AC power supply.

8. The DC power supply apparatus according to claim 7, wherein each of the third rectifying portion and the fourth rectifying portion is formed by gallium nitride.

9. The DC power supply apparatus according to claim 7, wherein each of the first switching portion and the second switching portion is formed by gallium nitride.

10. The DC power supply apparatus according to claim 7, wherein the first switching portion and the second switching portion is integrated to form a module.

11. A freezing apparatus driving an air blower or a compressor by using a DC output supplied from the DC power supply apparatus according to claim 7.

12. An air conditioning apparatus driving an air blower or a compressor by using a DC output supplied from the DC power supply apparatus according to claim 7.

* * * * *